Aug. 11, 1959  J. A. MARQUARDT  2,899,544
DEVICE TO DETERMINE THE POSITION OF A MOVING CAR IRRESPECTIVE
OF THE NUMBER OF WHEELS ON EACH TRUCK THEREOF
Filed April 5, 1954  2 Sheets-Sheet 2
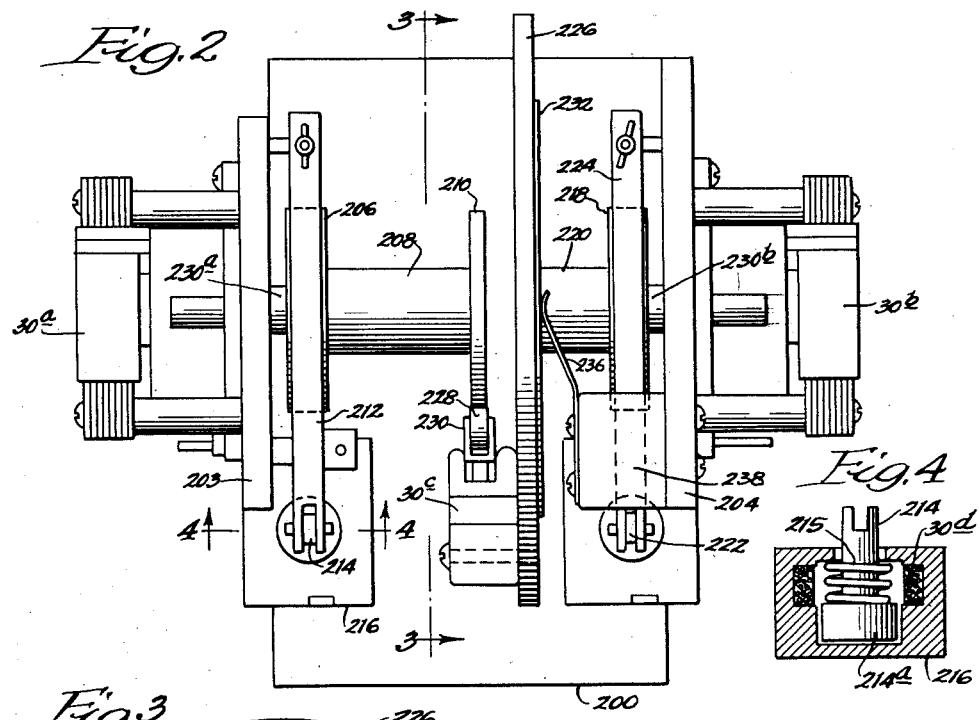
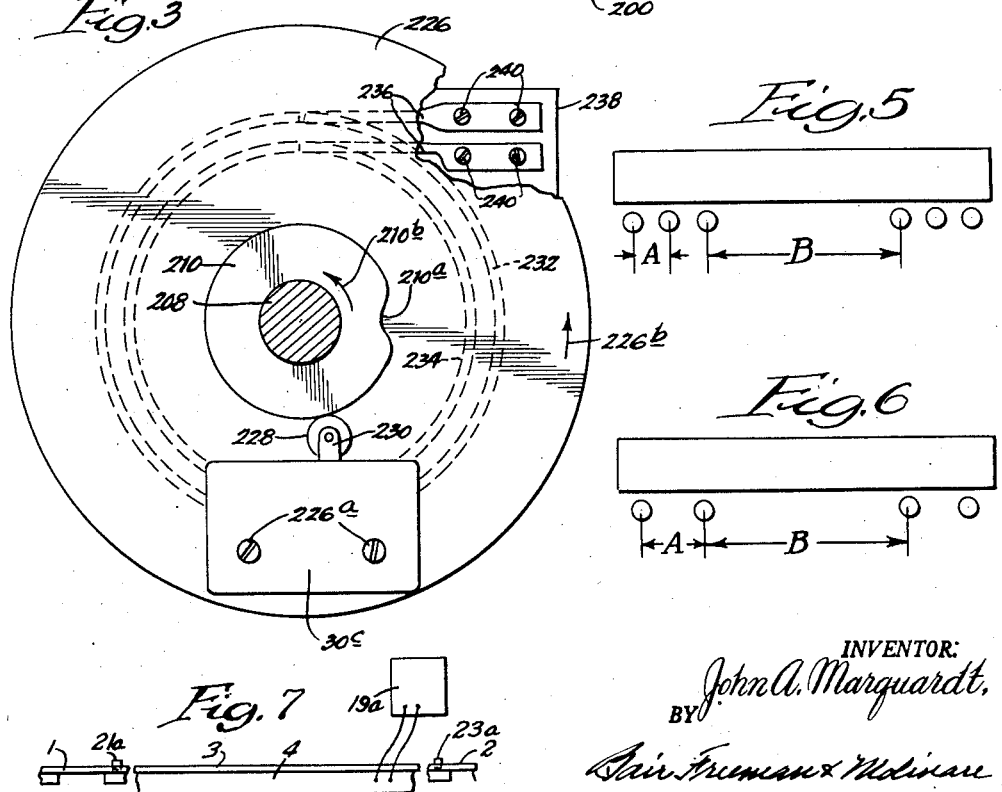
INVENTOR:
John A. Marquardt,
BY
ATTORNEYS.

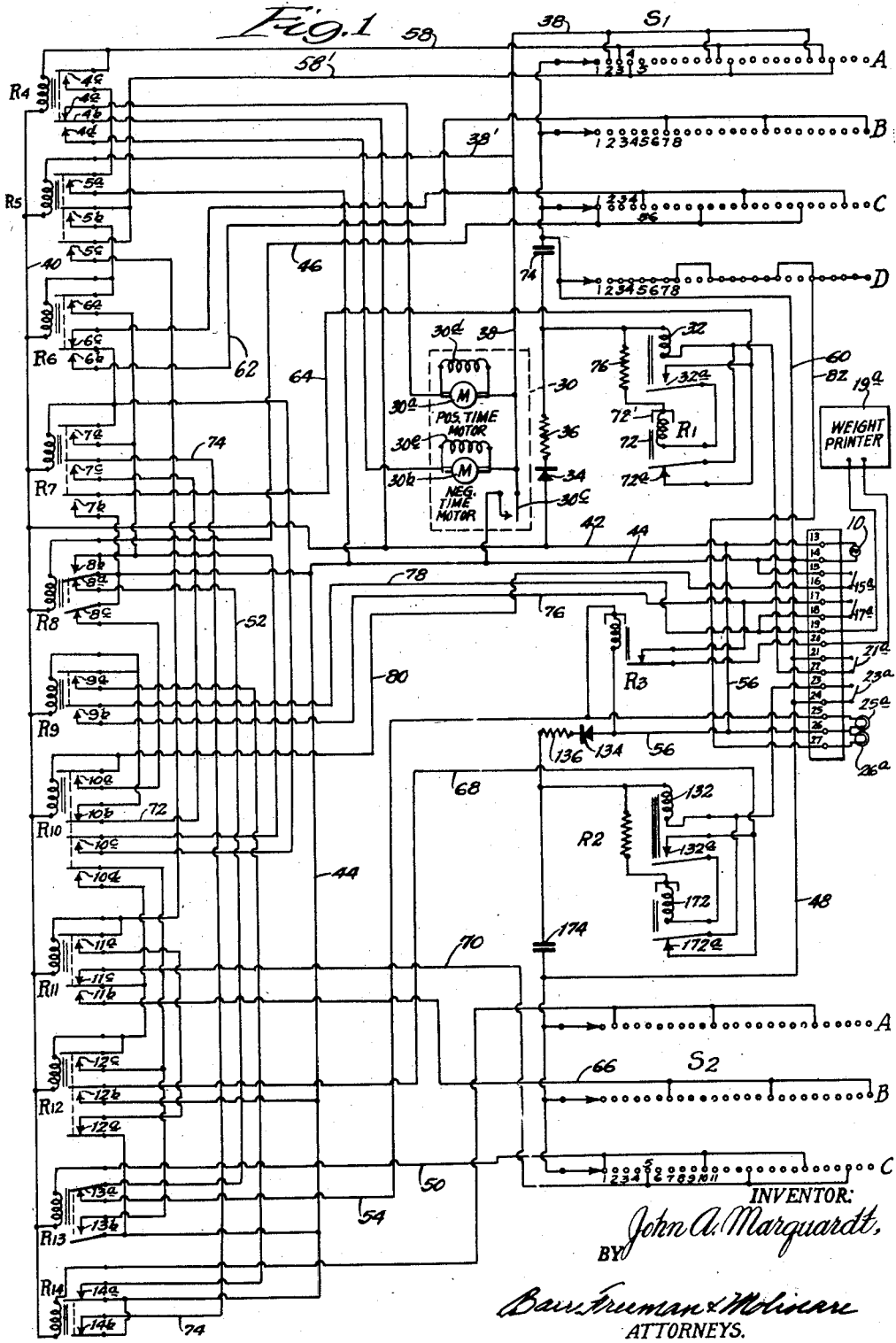

United States Patent Office 2,899,544
Patented Aug. 11, 1959

2,899,544

DEVICE TO DETERMINE THE POSITION OF A MOVING CAR IRRESPECTIVE OF THE NUMBER OF WHEELS ON EACH TRUCK THEREOF

John A. Marquardt, Elmhurst, Ill., assignor to Streeter-Amet Company, Chicago, Ill., a corporation of Illinois Application April 5, 1954, Serial No. 420,792

9 Claims. (Cl. 246—77)

The present invention relates to an improved device to determine when a moving railroad car is on a weighing or similar device and operable over a range of car speeds and accelerations and irrespective of the number of wheels on each truck of the car.

In one method of weighing railroad cars, the cars are individually released at the top of a grade and roll down the grade to be switched to any one of several train make-up tracks. At some point on the grade or on the adjacent level track a weighing platform is provided, the platform having suitable car weighing elements to measure the weight of the car as it travels over the platform. Since mechanisms of this kind require a measurement of weight at the instant the car is fully on the platform and before it leaves the platform, it is desirable to provide sensing means which will ascertain this condition and condition or gate the weighing mechanism to record only the weight on the platform at that time. The term "gate" as employed herein means that the mechanism operates to place itself in condition to effect a weighing and printing operation. However, since the common railroad cars may have either four wheel trucks or six wheel trucks, and the cars may have varying velocities as they travel over the platform, it is desirable that the sensing mechanism be immune to the number of wheels of each truck and the particular velocity of the car.

In the apparatus herein described an entrance track switch is provided on one side of the scale platform and an exit track switch is provided on the other side of the platform. A stepping switch is connected to each of these track switches to advance one step for each actuation of the corresponding track switch. When the entrance track switch is first actuated, timing means is started in the positive time direction. Upon second actuation of the entrance track switch by the second pair of wheels, the timing means is started in the negative time direction. When the third pair of wheels actuate the entrance time switch the stepping switches are conditioned in accord with the state of the timing means at that time. If the timing means has returned to rest or zero time position, the stepping switches are set to hunt to the dwell position after four actuations. If, on the other hand, the timing means has not returned to the rest position the stepping switches are conditioned to hunt to the dwell position after six actuations. The dwell position of the stepping switches are the positions which the switches normally occupy at the start of an operation and in which they will remain until moved by an outside force. The switches are said to hunt when they move automatically without outside intervention to the dwell position.

When the entrance stepping switch has reached the dwell position, the scale unit is gated to record the weight on the scale platform. Upon first actuation of the exit track switch the scale unit is restored to the normally blocked condition. When the exit stepping switch has reached the dwell position, the entire apparatus is restored to the quiescent condition awaiting a new car.

It is therefore a general object of the present invention to provide an automatic means to determine when a car is in the space between a pair of track switches irrespective of whether the car trucks have one number of wheels each or a different number of wheels each.

Another object of the present invention is to provide apparatus which accomplishes the above object regardless of the exact speed of the car.

Still another object of the present invention is to provide an apparatus which senses the passage of the first truck of the car to ascertain the number of wheels per truck of the car and conditions itself for further operation accordingly.

Yet another object of the present invention is to provide an apparatus of the above type in which a single, reliable and efficient timing apparatus operates the sensing mechanism.

Another object of the present invention is to provide an improved apparatus to sense the position of a car on a scale platform and includes manually controlled weight recording elements which are disabled if the car is partially off the scale.

Still another object of the present invention is to provide a mechanism including stepping switches which hunt to dwell position after the car wheels have travelled over the track switch.

The novel features which I believe to be characteristic of my invention are set forth with particularity in the appended claims. My invention itself, however, both as to its organization and method of operation, together with further objects and advantages thereof, will best be understood by reference to the following description taken in connection with the accompanying drawings in which:

Figure 1 is a schematic circuit diagram of a railway car weighing mechanism constructed in accordance with the present invention;

Figure 2 is a top plan view of the timer portion of the mechanism of Figure 1;

Figure 3 is a fragmentary cross-sectional view through axis 3—3, Figure 2;

Figure 4 is a diagrammatic view showing the brake solenoid construction for the positive time motor;

Figure 5 is a somewhat schematic side elevational view showing a railroad car with six wheel trucks;

Figure 6 is a view like Figure 5 but showing a railroad car with four wheel trucks; and Figure 7 is a diagrammatic view of a scale installation embodying the invention.

*Summary of operation*

In brief, the mechanism operates as follows:

When the apparatus is conditioned to receive a car the entrance stepping switch S1 and the exit stepping switch S2 are in the rest positions shown. The relays are in the unenergized condition making contact or not making contact as shown in Figure 1, with the exception of relays R3, R8 and R13. The latter is energized through the C bank of the exit stepping switch S2 and the former is energized through contacts 13a of relay R13. Relay R8 is also energized through the C bank of entrance stepping switch S1.

When the entrance track switch 21a is actuated, terminals 21—22, Figure 1, are momentarily connected, thus causing the entrance stepping switch S1 to shift one step and starting the timing unit 30 in the positive time direction. The next actuation of the entrance track switch causes the entrance step switch S1 to shift a further step to the number 3 position and reverses the direction of the timing unit 30. The third actuation of the entrance track switch S1—due to the third pair of wheels on the car—shifts the entrance stepping switch one step further to the number 4 position. If at this moment the timing unit has not returned to the initial or rest position the stepping switches S1 and S2 are both conditioned (by energization of selector relay R6 and selector relay R11) for a six wheel truck car and do not hunt to the dwell position until six actuations of the respective track switches. On the other hand, if the time integrating switch has returned to the initial or rest position before the third actuation of the entrance track switch then relays R6 and R11 remain unenergized and the stepping switches S1 and S2 are both conditioned for a four wheel truck car and hunt to the dwell position after four actuations of the respective track switches.

When the entrance stepping switch S1 has executed a full cycle of steps from the initial dwell position to the next dwell position (a total of 9 steps), the apparatus energizes relay R3 which establishes a circuit across terminals 19—20. This causes the weighing and printing apparatus 19a to print the weight of the car. It will be noted that at this instant the car is between the entrance and exit track switches and hence is on the scale platform.

As the car leaves the scale platform the exit track switch 23a is successively actuated by the successive pairs of car wheels. When four actuations have occurred, in the case of a car with four wheel trucks, or six actuations have occurred, in the case of a car with six wheel trucks, the exit stepping switch S2 hunts to the dwell position. The exit stepping switch S2 is conditioned to the number of wheels on the car truck at this time by the prior action of the timing unit 30, which is stored in the energized or unenergized condition of relay R11. When the exit stepping switch S2 has reached a dwell position the unit is conditioned to receive the next car.

The timer

The timer—indicated generally at 30, Figure 1, is shown in detail in Figures 2 and 3. It consists of a base plate 200 having upstanding spaced end plates 203 and 204. The positive timer motor 30a is mounted on end plate 203 with its shaft 230a protruding through that wall. Shaft 230a receives the brake drum 206, the stub shaft 208, and the cam 210. The brake drum 206 receives the brake band 212 which is pulled downwardly into frictional gripping engagement with the drum by a spring 215 which bears against the plunger 214 of the solenoid 216. The solenoid 216 has a winding 30d, Figures 1 and 4, which coacts with a magnetic enlarged portion 214a on the plunger 214 to overcome the force of spring 215 and relieve the friction on the drum 206. This construction is shown in diagrammatic cross-sectional view in Figure 4. It will be noted that the winding 30d is connected in Figure 1 for energization in unison with the motor 30a so that the brake is released when motor 30a is energized and the brake is set when the motor 30a is not energized.

The end wall 204 carries a negative time motor 30b which has shaft 230b protruding through that wall. A brake drum 218 and a stub shaft 220 are mounted on shaft 230b. A brake band 224 is received on the brake drum 218 and is drawn to frictional gripping engagement by plunger 222 in the same fashion as band 212 is drawn into engagement by plunger 214. That is, a spring (not shown) draws the band to gripping engagement when the winding 30e, Figure 1, is not energized and the spring pressure is overcome when winding 30e is energized. Thus motor 30b is either braked in an unenergized position or is energized and the brake released.

The shaft 220 receives a disc 226 which faces the cam 210 and is coaxial therewith as shown in Figures 2 and 3. The disc 226 receives a pressure actuated switch 30c which may be any one of the many types of such switches well known in the art. The switch is held in position on the face of plate 226 between screws 226a. It has a pressure roller 228 carried by bearing posts 230. The bearing posts 230 are part of a resiliently supported carriage which actuates the switch mechanism (not shown) so that when the roller 228 is in the position shown in Figure 3, the switch is in the circuit-making condition. However, when the switch moves to the position where the roller 228 rides in the notch 210a of cam 210 under the pressure of the biasing spring (not shown), the switch 30c switches to the open circuit position shown in Figure 1.

The motor 30a rotates cam 210 in the counterclockwise direction as seen in Figure 3 and as indicated by arrow 210b. The motor 30b rotates plate or disc 226 in the counterclockwise direction as seen in Figure 3 and indicated by arrow 226b. Thus rotation of motor 30a moves the cam 210 counterclockwise in relation to the disc 226 and subsequent rotation of motor 30b moves the disc 226 counterclockwise thus causing switch 30c to "catch up" with the notch 210a or to close the space between them.

The terminals of switch 30c are connected to slip rings 232 and 234 which are wiped by a pair of brushes 236. These brushes are mounted on an insulating block 238 by bolts 240 which serve as circuit connectors for the two wipers and hence the slip rings and the switch 30c.

Operation of the timer

Initially, the disc 226 and the cam 210 are so related in position that the roller 228 rides in notch 210a. When the first pair of car wheels pass over the entrance track switch as above described, the motor 30a is energized and rotates the cam 210 in the counterclockwise direction of Figure 3. This displaces the switch 30c from the notch 210a, thus closing switch 30c and maintaining the energization of the motor 30a as shown in Figure 1. The cam 210 thus continues to rotate. When the next pair of car wheels pass over the entrance track switch, motor 30a is de-energized and motor 30b energized as above described. This arrests further rotation of cam 210 and starts rotation of the disc 226 in the counterclockwise direction of arrow 226b, Figure 3, thus causing the cam switch at 30a to "catch up" with the prior rotation of cam 210. This rotation continues until the roller 228 again rides into notch 210a, at which time switch 30c opens to brake the energizing circuit to the motors 30a and 30b.

As above described, the operation of the mechanism is based upon the switch 30c being closed at the time the third set of wheels cross the track switch—in the case of a six wheel truck car—or being opened at that time in the case of a four wheel truck car. If, as is usual practice, the car is going on an incline and accelerating, this will occur with motors 30a and 30b having the same rotational velocity. On the other hand, if the car is not accelerating or even slightly decelerating this operation can be secured by providing a motor 30b with a somewhat lower rotational velocity than motor 30a, in which event the time required for switch 30c to "catch up" with the rotation of cam 210 will be longer than the time required for the initial rotation of cam 210.

Detailed operation

The apparatus is supplied with power from a source 10 which may be a conventional 110-volt 60-cycle supply connected to the terminals 13 and 14. When the terminals 13 and 14 are energized the apparatus is in the position shown in Figure 1 in condition for the entrance of a car to be weighed. In this condition the relay R8 is energized through a circuit from terminal 13, conductors 42 and 40, relay R8, conductor 46, terminal 1 of the C bank of stepping switch S1 and conductor 60 back to terminal 14. Relay R13 is also energized through a circuit from terminal 13, conductors 42 and 40, relay R13, conductor 50, terminal 1 of the C bank of the exit stepping switch S2 and conductor 48 to terminal 14. Relay R3 is also energized through a circuit from terminal 13 through conductors 42 and 56, relay R3, conductor 54, contacts 13a of relay R13, conductor 52, contact 8a of relay R8 and conductor 44 to terminal 14. However, no circuit is established across terminals 19—20 because relay R9 is not energized and the contacts 9b are accordingly open. Thus the unit does not establish a circuit across terminals 19 and 20 required to actuate the weight printing apparatus.

With the apparatus in this condition it is possible to cause the weight printer 19a to print the weight by closing the "manual print" switch 17a to establish a circuit across terminals 17 and 18. This circuit can be traced from terminal 20 through switch R3 (which is closed) to terminal 17, and through the "manual print" switch to terminal 18. Thus it is possible at will to print the weight of the platform without a car and thus provide a zero reading for calibration purposes.

The weighing mechanism may be of any desired type as shown diagrammatically in Figure 7 including an entrance track section 1 on which the entrance track switch 21a is mounted to be operated by the wheels of each car truck crossing the entrance track section and a similar exit track section 2 carrying the exit track switch 23a to be actuated by each wheel of a car leaving the weighing section. The space between the entrance and exit track section is separated by a weighing track section 3 of a length sufficient to support a whole car. The weighing track section 3 is supported on any desired type of weight sensing means such as a platform 4 supported on electrical load cells whose effective resistance will change in proportion to the weight imposed upon them. The load cells may be connected in circuit with a weighing and printing mechanism 19a which will be adjusted in accordance with the load on the weighing track section 3 and which will effect a printing operation each time a circuit thereto is closed as by completion of a low resistance circuit between terminals 19 and 20 as shown in Figure 1.

Terminals 21 and 22 are connected to a track switch 21a located on the entrance side of the scale platform. This switch may be any of the many types well known in the art. Typically such switch consists of a section of rails yieldably supported and adapted to close a switch when depressed by a pair of car wheels, or one of a pair of car wheels or a switch having an operating member to be engaged by a car wheel rolling over the track to close the switch each time a wheel passes. Such switches are referred to herein as "track switches."

When actuation of the entrance track switch 21a establishes a circuit across terminals 21 and 22, the actuating coil 32 of the entrance stepping switch S1 is energized through the circuit which can be traced from power terminal 13 through rectifier 34, resistance 36, coil 32, terminal 22, switch 21a, terminal 21, and to the other power terminal 14. Since the track switch is actuated momentarily, the coil 32 is actuated and then released, thus causing the stepping switch S1 to shift one step. This shifting action is achieved by any one of the devices well known in the art for this purpose. One such device consists of a pawl and ratchet mechanism having its pawl attached to a plunger actuated by current flow in winding 32, the plunger being biased to a retracted position by a suitable spring.

When the stepping switch S1 has shifted one step, the four contact making members move in unison to the number 2 contacts of the switch. This de-energizes the relays R8 and R13 and energizes the control relay R5 through the circuit traceable from the power terminal 14 to the stepping switch contacts, the second contact of the A bank of the switch S1, conductor 38, conductor 38' the winding of relay R5, conductor 40, and conductor 42 back to the power terminal 13. Simultaneously, the positive time motor 30a of the timing unit 30 is energized from conductor 38, which is then connected to power terminal 14, and through the normally closed contacts 4a and 4b of the relay R4 back to the conductor 42 and the power terminal 13. The timer unit 30 accordingly starts in the positive direction as described above.

When the control relay R5 closes, and the timer unit 30 starts in the positive time direction, the cam switch 30c is closed. This occurs when the motor 30a rotates the unit 30 beyond the dead position or rest position where switch 30c is open. This provides an energizing path for the motor 30a from terminal 14 through switch 30c and an energizing path through conductor 38, conductor 38', the winding of relay R5, and conductors 40 and 42 back to terminal 13 to seal the relay R5 in the closed position.

When the second pair of wheels cross the entrance track switch a circuit is again momentarily created through switch 21a across terminals 21—22. This actuates the entrance stepping switch S1 as above described to shift the movable contacts thereof in unison to the number 3 position. Relay R4 is thereby energized through a circuit from terminal 13, conductors 42 and 40, relay R4, conductor 58, contact 3 of the A bank of the stepping switch and conductor 60 to terminal 14. This causes closure of the relay R4 and the breaking of contacts 4a and 4b and making of contact between contacts 4b and 4d, with the consequence that the negative time motor 30b is connected in circuit and the positive time motor 30a de-energized. The circuit for negative time can be traced from terminal 13 through conductor 42, contacts 4b and 4d of relay R4, motor 30b, switch 30c, and conductor 44 to terminal 14. The timer 30 accordingly moves in the negative time direction. In other words, the disc 226, Figure 3, is moved in direction to close the spacing between roller 228 and notch 210a. Relay R4 seals in through the circuit which can be traced from terminal 13, conductors 42 and 40, and relay R4, through contacts 4c of relay R4, and contacts 5a of relay R5 to conductor 44 and the terminal 14.

The negative time rotation of the timer 30 continues until relatively movable parts thereof are restored to the rest position where the switch 30c opens. That is, the disc 226 rotates until the roller 228 rides into notch 210a. This may happen before or after the third actuation of the track switch, depending on the spacing of the wheels of the car. If the car has four wheel trucks, the space between the trucks is such that the timer will be restored to the rest position by the time the first wheels of the second truck actuate the track switch. See Figures 5 and 6. On the other hand if the car has six wheel trucks the track switch will be actuated before the timer 30 has returned to the rest position since in this instance the switch will be actuated soon after the second actuation.

The third actuation of the track switch causes the entrance stepping switch S1 to shift one step to the number four position. If—at this instant—the timer 30 has not yet returned to the rest position where switch 30c is open, relay R5 will be energized through a circuit from terminal 13, conductors 42 and 40, relay R5, conductors 38' and 38, switch 30c and conductor 44 to terminal 14. The relay R11 in that event would be energized through a circuit from terminal 13, conductors 42 and 40, relay R11, contacts 5c of relay R5, conductor 58', the fourth contact in bank A of stepping switch S1 and conductor 60 to terminal 14. Relay R11 locks or seals in through a circuit from the relay coil, the contacts 11a, contacts 12a of relay R12, and conductor 44 to terminal 14. Also, relay R6 is energized through a circuit from terminal 13, conductors 42 and 40, relay R6, contacts 5b of relay R5, conductor 58', the fourth contact in bank A of stepping switch S1 and conductor 60 to terminal 14. Relay R6 locks in through a circuit from the relay coil through contacts 6a, contacts 8b of relay R8, and conductor 44 to terminal 14.

The effect of energizing relays R6 and R11 as above described is to condition each of the stepping relays R1 and R2 to hunt to dwell position after six actuations.

In the case of the entrance stepping relay S1 this is accomplished through the B bank which connects conductor 62 through conductor 60 to terminal 14 after six actuations of the track switch. The resultant connection of conductor 62 energizes relay R7 through a circuit from terminal 13, conductors 42 and 40, relay R7, contacts 6b of relay R6, conductor 62, the B bank of stepping switch S1, and conductor 60 to terminal 14. Relay R7 seals in through a circuit from the relay contacts 7a, contacts 8b of relay R8, and conductor 44 to terminal 14. The hunt conductor 64 is energized by connection to terminal 14 through contacts 7b of relay R7 and the conductor 44 to cause hunting action of the stepping switch S1 as hereinafter described.

With respect to the exit stepping switch S2 the hunting circuit is established after six actuations (which occur when the exit track switch has been actuated six times) through a circuit from terminal 13, conductors 42 and 40, relay R12, contacts 11b of relay R11, conductor 66, the seventh contact of the B bank of stepping switch S2, and conductor 48 to terminal 14. The hunt conductor 68 is then energized by connection to the terminal 14 through conductor 44 and contacts 12b of the relay R12. As above described, however, the six actuations of stepping relay S2 do not take place until the exit track switch has been actuated six times, indicating the exit of a car having two six wheel trucks from the weighing platform.

In the event the third actuation of the entrance track switch occurs after the timer 30 returns to the rest position, the switch 30c will have opened. This stops the timer 30 and de-energizes relay R5, causing all the contacts thereof to open. When the stepping switch S1 reaches the number four position—after the third actuation of the entrance track switch—relays R6 and R11 remain unenergized since the energizing circuit to the former is open at contacts 5b of relay R5 and the energizing circuit to the latter is open at contacts 5c of relay R5.

However, when the fourth actuation of the entrance track switch occurs—due to traverse by the last pair of wheels of a four wheel truck car—the entrance track switch steps to the number five position. This establishes a circuit from terminal 14 through conductor 60, the fifth contact of the C bank of stepping switch S1 and the normally closed contacts 6c of relay R6 to the relay R7, and back to terminal 13 through conductors 40 and 42, contacts 6c being closed as at this time relay R6 is unenergized. Relay R7 accordingly closes and locks in through contacts 7a and contacts 8b of R8 as above described with reference to actuation by a six wheel truck car. The entrance stepping switch thereupon hunts until the dwell position (number 10) is reached to actuate relay R8 and drop out relay R7, thus deenergizing hunt conductor 64. Relay R8 is energized through a circuit from terminal 13, conductors 42 and 40, relay R8, conductor 46, terminal 10 of the C bank of stepping switch S1, and conductor 60 to terminal 14.

In the case last above described—where the car has four wheel trucks—the exit stepping switch S2 hunts after four actuations of the exit track switch. This results from the fact that relay R5 never caused relay R11 to close and lock in. Hence, when the moving contacts of exit stepping switch S2 reach the number 5 position (four actuations) the terminal 14 is connected through conductor 48 the C bank of switch S2 to the conductor 70. The latter is connected through the normally closed contacts 11c of relay R11 to relay R12, thus closing the latter. Contacts 12b thus close to connect conductors 44 and 68 to cause hunting of exit stepping switch S2 as hereinafter described.

Energization of conductor 64 causes hunting of the stepping switch S1 through intermittent energization of the winding 32. The latter winding is operationally connected to a plunger and a pawl and ratchet or similar mechanism as is well known in the art to shift the moving contacts one step each time winding 32 is energized. At the instant voltage is available at the conductor 64, the contacts 72a are closed so that winding 32 is energized by unidirectional current through resistance 36 and rectifier 34. Capacitor 74 smooths the pulsations of current flow in winding 32. Energization of winding 32 advances the stepping relay one step by reason of a conventional stepping switch pawl and ratchet or similar mechanism (not shown). It also closes contacts 32a to energize winding 72 from conductor 64 through contacts 32a and resistance 76, resistance 36 and rectifier 34 to terminal 13. Winding 72 is on an iron core, as indicated, with a conventional shading coil as indicated at 72' so that when it is thus energized it does not drop out until after a time delay period even though contacts 32a are opened. When current flows in winding 72, the contacts 72a are opened, thus de-energizing winding 32 and allowing contacts 32a to open. After a predetermined time delay fixed by the shading coil characteristics, the contacts 72a again close to energize winding 32 through the circuit described above and shift the stepping switch S1 one more step in the forward direction. This stepping action is repeated until the stepping switch reaches the dwell position (number 10) where relay R8 is energized through the circuit described above including conductor 46 and the bank C of the stepping switch S1. Relay R8 when energized, opens the contact 8b and thus de-energizes relays R7 (sealed closed through contacts 7a and 8b), and R6, if closed (sealed closed through contacts 6a and 8b). When relay R7 thus opens, contacts 7b part to re-energize conductor 64 and thus arrest the hunting action.

Whether the car be a four wheel truck car or a six wheel truck car the condition of the mechanism when the entrance stepping switch S1 has reached the dwell position and the exit stepping switch S2 has not yet been actuated is as follows:

(1) Relays R4, R5, R6 and R7 are de-energized.
(2) Timer 30 is on the rest position (contacts 30c open).
(3) Relay R8 is energized through conductor 46 and the C bank of entrance stepping switch S1.
(4) Exit stepping switch S2 is on the initial dwell position as the exit track switch has not been actuated.
(5) Exit time relay R13 is energized through the C bank of exit stepping switch S2.
(6) Relay R3 is energized through a circuit from terminal 14, conductor 44, contacts 8a of relay R8 (closed because that relay is energized), conductor 52, contacts 13a of relay R13, conductor 54, relay R3, and conductor 56 to terminal 13. R3 accordingly closes after a time delay determined by the dash pot or other time delay mechanism (not shown) provided as a part of its structure.
(7) Relay R9 is closed and locked in through a circuit from terminal 13, conductors 42 and 40, relay R9, contacts 9a, contacts 14a of release relay R14, and conductor 44 to terminal 14. Relay R9 was energized initially through a circuit from terminal 13, conductors 42 and 40, relay R9, normally closed contacts 10b of relay R10, conductor 72, contacts 7c of relay R7, conductor 74, normally closed contacts 14b of relay R14, and conductor 44 to terminal 14. Contacts 7c were closed during the time the stepping switch S1 was hunting as described above, this taking place after four steps in the case of four wheel truck cars and after six steps in the case of six wheel truck cars.
(8) Circuit is established between the auto print terminals 19—20 which can be traced from terminal 20 through the contacts of relay R3, conductor 76, contacts 9b of relay R9, and conductor 78 back to terminal 19. This causes the printer 19a to print the weight of the car on the scale platform.

When the first pair of car wheels leaves the scale platform, the exit track switch 23a connects terminals 23—24. This switch is structurally similar to the entrance track switch to close when traversed by one of a pair of car wheels. This energizes winding 132 of the exit stepping switch S2 through a circuit from terminal 13, conductor 56, rectifier 134, resistor 136, winding 132, terminal 23, switch 23a, terminal 24, and conductor 48 to terminal 14 to advance the movable contacts thereof in unison from position number 1 to position number 2. Winding 132 is provided with unidirectional current for this purpose by the rectifier 134 and resistor 136, whose action is smoothed by capacitor 174. Stepped shifting movement of the exit stepping switch S2 is achieved when coil 132 is energized by any of the many ways well known in the art, such as a pawl and ratchet and magnetic plunger mechanism as described above in relation to switch S1.

When the exit stepping switch S2 thus reaches the number 2 set of contacts, relay R14 is energized through a circuit from terminal 13, conductors 42 and 40, relay R14, the second contact of the A bank of stepping switch S2, and conductor 48 to terminal 14. This opens contacts 14a and 14b to de-energize all the relays except R11 if perchance any remain energized.

The relay S2 is then stepped once per pair of wheels until its hunting position is reached. In the event that the car is a four wheel truck car, selector relay R11 is in the unenergized condition described above by reason of the action of the timer 30 and the entrance stepping switch S1. If the car has six wheel trucks R11 is energized. In the former event relay R12 is energized through a circuit from terminal 13, conductors 42 and 40, relay R12, contacts 11c of relay R11, conductor 70, contact 5 of the C bank of stepping switch S2 and conductor 48 to terminal 14 and stepping occurs after four actuations of the exit track switch. In the latter event the relay R12 is energized through a circuit from terminal 13, conductors 42 and 40, relay R12, contacts 11b of relay R11, conductor 66, contact 7 in the B bank of stepping switch S2, and conductor 48 to terminal 13. In any event hunting occurs when hunting conductor 68 is energized by contacts 12b of the relay R12, which locks in when energized through a circuit from terminal 13, conductors 42 and 40, relay R12, contacts 12c, contacts 13b of relay R13 and conductor 44 to terminal 14. In either case the stepping winding 132 is energized through a circuit from terminal 13, conductor 56, rectifier 134, resistor 136, winding 132, switch 172a, conductor 68, contacts 12b of relay R12, and conductor 44 to terminal 14.

Hunting action of the exit stepping switch S2 is achieved by periodic energization of the coils 132 and 172 through contacts 172a and 132a, respectively, in the same fashion as above described with reference to the hunting action of stepping switch S1. The hunting continues until the conductor 68 is de-energized, an event which occurs when the number 10 step is reached by the stepping switch S2. At this time relay R13 is energized through a circuit from terminal 13, conductors 42 and 40, relay R13, conductor 50, the C bank of stepping switch S2, and conductor 48 to terminal 14, thus opening contacts 13b and de-energizing relay R12. This opens contacts 12b to de-energize conductor 68 and thus prevent further hunting of the stepping switch S2.

Since the car had completely traversed the exit track switch before hunting of the exit stepping relay commenced, the unit is restored to the rest position when the car has left the scale platform.

Whenever the relay R3 receives voltage, the cycle light 25a is energized. This light is connected across terminals 25 and 26. As above described, it is energized when the car is completely off the scale platform and the unit is awaiting a new car and is also energized when a car is completely on the scale platform since it is at these times that relay R3 is energized and the terminals 25 and 26 are across the coil of that relay.

It is essential that the system be conditioned to receive a car or be "in cycle" at the time a new car is received on the scale platform. If the cycle light connected across terminals 25 and 26 is not energized, the operator knows the unit is not so conditioned. The operator can then press the manual recycle button 15a which establishes a circuit across terminals 15 and 16. The effect of pressing this button is to energize relay R10 through the circuit which can be traced from terminal 14 to terminal 15, through the recycle button to terminal 16, and through conductor 80 to relay R10. The relay is connected to the conductor 40 which is connected to terminal 13 through conductor 42. Relay R10 is accordingly energized. This causes contacts 10c to establish an energizing circuit to relay R7 which can be traced from terminal 14 through conductor 44 to normally closed contacts 8b of relay R8, contacts 10c, to relay R7 and back to terminal 13 through conductors 40 and 42. Relay R7, when closed, energizes the hunt conductor 64 of the entrance stepping switch S1 through a circuit from terminal 14, conductor 44 and contacts 7b of relay R7. Relay R7 seals or locks itself in the energizing condition through a circuit from terminal 13, conductors 42 and 40, relay R7, contacts 7a, contacts 8b of relay R8 and conductor 44 to terminal 14. The stepping switch S1 accordingly hunts as above described until the dwell position is reached, at which time the circuit to conductor 64 and to relay R7 is broken by opening of the normally closed contact 8b of relay R8 as described above. The latter relay is energized through a circuit from terminal 13, conductors 42 and 40, relay R8, conductor 46, the C bank of stepping switch S1, and conductor 60 to terminal 14.

With respect to the exit stepping switch S2, actuation of the manual recycle button to connect terminals 15 and 16 and energize relay R10, initiates hunting operation by closing the contacts 10d when relay R10 is energized as above described. This energizes relay R12 through a circuit from terminal 13, conductors 42 and 40, relay R12, contacts 10d of relay R10, contacts 13b of relay R13, and conductor 44 to terminal 14. When relay R12 is energized it locks in through its own contacts 12c which completes a circuit from the relay R12 through contacts 13b of relay R13 and conductor 44 to terminal 14. Moreover, contacts 12b of relay R12 establish a circuit from terminal 14 through conductor 44 to the holding conductor 68 of the stepping switch S2. This causes holding action as above described until the dwell position is reached, at which time relay R13 is energized through the C bank of the exit stepping switch S2 as above described to open the normally closed contacts 13b and thereby interrupt the energizing circuit to relay R12 through contacts 12c, thus causing the latter to drop out.

When the unit is "in cycle" the relay R3 is energized through a circuit from terminal 13, conductor 56, relay R3, conductor 54, contacts 13a of R13 and contacts 8a of relay R8 back to conductor 44 and terminal 14. The former relay indicates that the exit stepping switch S2 is on dwell position whereas the latter relay indicates that the entrance stepping switch is on position. It is at this time that the cycle light 25a connected across terminals 25 and 26 is energized. If the manual print button 17a connected across terminals 17 and 18 is pressed at this time, a circuit is established between these terminals and—since relay R3 is energized—a circuit established from terminal 19 through terminals 17 and 18 or relay R3 to terminal 20. The weighing apparatus accordingly prints to print the weight of the platform only for calibration purposes.

However, if for any reason the unit is not "in cycle," relay R3 will not be energized and pressing the manual recycle button will cause no printing.

The above operation of the manual print button connected across terminals 17 and 18 assures that the scale platform either has no weight at the instant of print or has a full car weight. In the former case, the print serves as a zero calibration. In the latter instance, the print serves to indicate the weight of the full car. If for any reason the weighmaster presses the manual print button while the car is partially on the scale platform—that is some wheels are between the entrance stepping switch and the exit stepping switch and other wheels are outside this zone—no print will be made so that there is no opportunity for an erroneous reading.

It will be noted that the manual print feature is an addition to the automatic print achieved through the 9b contacts of relay R9 which is energized as above described when the car is fully on the scale platform.

A "car on scale" light 26a is connected across terminals 26 and 27 and connected through conductor 82 to the D bank of the entrance stepping switch S1. This light is accordingly energized when the entrance stepping switch is not on the dwell position, indicating that the car is entering the scale but is not fully on it.

Figures 5 and 6 show in diagrammatic fashion the spacing of the wheels on typical six wheel truck cars and four wheel truck cars. In each instance it will be noted that the wheels on individual trucks are spaced by a comparatively short distance A whereas the adjacent wheels of successive trucks are spaced by a much greater distance B. In addition, it will be noted that in the case of the six wheel truck car of Figure 5 the successive wheels of each individual truck are spaced essentially the same distance apart.

Thus when the six wheel truck car runs down an incline the time period between actuations of the entrance track switch by the first two pairs of wheels will be slightly greater than the time between the second and third pair of wheels. It follows that the timer 30 will not have time to return to the rest position. On the other hand if the car has four wheel trucks the time period between the first two pairs of wheels will be much less than between the second and third pair of wheels because of the much greater spacing B, even though the car is accelerating.

If the motor 30b is made to rotate at slightly smaller rotational velocity than the motor 30a the unit will distinguish between four wheel truck cars and six wheel truck cars in the same fashion as described above even though the cars are not accelerating. In this case, the time interval between the first and second pairs of wheels of the six wheel truck and the time interval between the second and third pairs of wheels will be the same but since the motor 30b rotates at a slower angular velocity, it will not restore the switch 30c to the off position until passage of the third set of car wheels.

It will be noted that the apparatus of the present invention is not sensitive to the speed of the cars. In other words, if the car travels fast, the time interval between the successive pairs of wheels will be shorter but the timer 30 will still sense the difference between 4 wheel truck cars and six wheel truck cars since the motor 30a will rotate to a smaller extent between passage of the first and second pairs of wheels. For this reason the unit reliably operates over a wide range of car speeds.

While I have shown and described specific embodiments of the present invention it will, of course, be understood that various modifications and alternative constructions can be made without departing from the true spirit and scope thereof. I therefore intend by the appended claims to cover all modifications and alternative constructions falling within their true spirit and scope.

What I claim as new and desire to secure by Letters Patent of the United States is:

1. A mechanism to determine when a car is wholly within the space between an entrance track switch and an exit track switch and to determine when the car has completely left that space, irrespective of whether the car has four wheel trucks or six wheel trucks, the mechanism comprising: stepping switches for the track switches respectively and each operable to shift one step each time the respective track switch is actuated, each stepping switch having a series of spaced dwell positions; means operable to cause said stepping switches to hunt to dwell position after four actuations or six actuations, selectively; a timing switch unit having a pair of relatively movable members, one of which moves over the surface of the other, and having switch elements defining one circuit condition when the members are in a predetermined rest relation and a different circuit condition when the members are displaced from that position; the timing switch unit including means responsive to initial actuation of the entrance track switch to move the members relative to each other continuously from the rest relation in one direction; the timing switch unit further including means responsive to a second actuation of the entrance track switch to move the members continuously in the opposite direction relative to each other and from the position reached in response to the first means to restore the switch unit to the rest position after a predetermined time determined by the extent of the first motion; and means controlled by the timing switch unit and operable to cause hunting of the stepping switches after six actuations each if said timing switch unit is displaced from the rest relation upon third actuation of the entrance track switch and otherwise to cause hunting after four actuations of each switch.

2. A mechanism to determine when a car is wholly within the space between an entrance track switch and an exit track switch and to determine when the car has completely left that space, irrespective of whether the car has four wheel trucks or six wheel trucks, the mechanism comprising: stepping switches for the track switches, respectively, and each operable to shift one step each time the respective track switch is actuated, each stepping switch having a series of spaced dwell positions; means operable to cause said stepping switches to hunt to dwell position after four actuations or six actuations, selectively; a timing switch unit having a pair of relatively movable members, one of which moves over the surface of the other, and having switch elements defining one circuit condition when the members are in a predetermined rest relation and a different circuit condition when the members are displaced from that position; the timing switch unit including means responsive to initial actuation of the entrance track switch to move the members relative to each other continuously from the rest relation in one direction; the timing switch unit further including means responsive to a second actuation of the entrance track switch to move the members continuously in the opposite direction relative to each other and from the position reached in response to the first means to restore the switch unit to the rest position after a predetermined time determined by the extent of the first motion; and means controlled by the timing switch unit and operable to cause hunting of the stepping switches after six actuations each if said timing switch unit is displaced from the rest relation upon third actuation of the entrance track switch and otherwise to cause hunting after four actuations of each switch; and indicating means responsive to the actuation of the entrance stepping switch from one dwell position to a succeeding dwell position to determine that the car is within the space between the switches and to the subsequent actuation of the exit stepping switch from one dwell position to a succeeding dwell position to determine that the car has left that space.

3. A mechanism to determine when a car is wholly within the space between an entrance track switch and an exit track switch and to determine when the car has completely left that space, irrespective of whether the car has four wheel trucks or six wheel trucks, the mechanism comprising: stepping switches for the track switches, respectively, and each operable to shift one step each time the respective track switch is actuated, each stepping switch having a series of spaced dwell positions; means operable to cause said stepping switches to hunt to dwell position after four actuations or six actuations selectively; timing switch means selectively operable in a positive direction or a negative direction; means to initiate operation of said timing switch means in the positive direction upon first actuation of the entrance track switch and in the negative direction upon the second actuation of the entrance track switch; means controlled by the timing switch means and operable to cause hunting of the stepping switches after six actuations each if said timing switch has not returned to its initial position when the entrance track switch is actuated for the third time and otherwise to cause hunting after six actuations of each switch; and indicating means responsive to the actuation of the entrance stepping switch from one dwell position to a succeeding dwell position to determine that the car is within the space between the switches and to the subsequent actuation of the exit stepping switch from one dwell position to a succeeding dwell position to determine that the car has left that space.

4. A mechanism to determine when a car is wholly within the space between an entrance track switch and an exit track switch and to determine when the car has completely left that space, irrespective of whether the car has four wheel trucks or six wheel trucks, the mechanism comprising: stepping switches for the track switches, respectively, and each operable to execute one step each time the respective track switch is actuated, each stepping switch having a series of spaced dwell positions; means operable to cause said stepping switches to hunt to dwell position after four actuations or six actuations, selectively; means operable to condition said last named means to cause hunting after six actuations if the time interval between the second and third actuations of the entrance track switch is less than a predetermined amount in relation to the time interval between the first and second actuation and otherwise to cause hunting after four actuations; and indicating means responsive to the actuation of the entrance track switch from one dwell position to a succeeding dwell position to determine that the car is within the space between the switches and to the subsequent actuation of the exit track switch from one dwell position to a succeeding dwell position to determine that the car has left that space.

5. A device operable to determine when cars have completely crossed a track switch irrespective of whether the cars have four wheel trucks or six wheel trucks, comprising in combination: a stepping switch having a dwell position; means to energize the stepping switch to shift one step each time the track switch is actuated by passage of a wheel thereacross; timing means operable to measure the extent the time interval between the first and second actuations of the track switch differs from the time interval between the second and third actuations of the track switch; and means operable to cause the stepping switch to hunt to a dwell position after six actuations if the last time interval is not greater than a predetermined amount in relation to the first time interval and to hunt to the dwell condition after four actuations if the last time interval is more than the said predetermined amount in relation to the first time interval.

6. A device to discriminate between railroad cars having four wheel trucks and railroad cars having six wheel trucks as they pass over a track switch comprising in combination: a cam switch unit having a cam driven by a first motor, a cam follower driven by a second motor and riding on the face of the cam, and switch means operable by the follower to an open circuit condition when the cam and cam follower have a predetermined relation and a closed circuit condition when the cam and cam follower have other relations; means responsive to initial actuation of the track switch by passage of a car wheel thereacross operative to establish a momentary energizing circuit for the one of said motors, said switch thereafter establishing a continuing energizing circuit for the first motor through the switch; means responsive to a second actuation of the track switch by passage of a second car wheel thereacross operative to interrupt said continuing energizing circuit and to establish an energizing circuit to the other of said motors through said switch, said other motor being operative to rotate the cam switch unit towards the rest position at a speed to reach the rest position after a time longer than the time required for actuation of the track switch by the last wheels of a six wheel truck and shorter than the time required for actuation by the second truck of a four wheel truck car; and, means responsive to the condition of the cam switch unit upon third actuation of the track switch to sense whether the third actuation of the track switch occurs in said shorter time or said longer time.

7. A device to discriminate between railroad cars having four wheel trucks and railroad cars having six wheel trucks as they pass over a track switch comprising in combination: a cam switch unit having cam driven by a first motor, a cam follower driven by a second motor and riding on the face of the cam, and switch means operable by the follower to establish one circuit connection when the cam and cam follower are in a predetermined rest relation and another circuit condition when the cam and cam follower have other relations; means responsive to initial actuation of the track switch by passage of a car wheel thereacross to energize the one motor to rotate in one direction; means responsive to a second actuation of the track switch by passage of a car wheel thereacross to de-energize said one motor and to energize the other motor to rotate in the same direction so as to reduce the displacement of the cam and cam follower caused by said one motor and at a rate sufficient to return the follower to the rest relation with respect to the cam after a time longer than the time required for actuation of the track switch by the last wheels of a six wheel truck and shorter than the time required for actuation by the second truck of a four wheel truck car; and, means responsive to the condition of the cam switch unit upon third actuation of the track switch to sense whether the third actuation of the track switch occurs in said shorter time or said longer time.

8. A device to discriminate between railroad cars having four wheel trucks and railroad cars having six wheel trucks as the cars travel over a track switch, comprising in combination: a switch unit having a pair of relatively movable members, one of which moves over the surface of the other, and having switch elements defining one circuit condition when the members are in a predetermined rest relation and a different circuit condition when the members are in all other relations; means responsive to initial actuation of the track switch by passage of a car wheel thereacross to move the members continuously from the rest relation in one relative direction of relative motion; means responsive to a second actuation of the track switch by passage of a car wheel thereacross to move the members continuously in the opposite relative direction from the position reached in response to said first means to restore the switch unit to the rest position after a predetermined time determined by the extent of the first motion; and, means responsive to the condition of the switch unit upon third actuation of the track switch to sense whether the third actuation of the track switch occurs in an interval greater or less than said predetermined time.

9. A device operable to determine when cars have completely crossed a track switch and operable whether the trucks of the car have a first number of wheels each or a second and greater number of wheels each, comprising: a stepping switch having a rest position; means to energize the stepping switch to shift one step each time the track switch is actuated by passage of a car wheel thereacross; timing means operable to measure the time elapsed between successive actuations of the stepping switch as the wheels of a car truck traverse the track switch; the timing means assuming a first condition when successive actuations of the stepping switch are at intervals not greater than are required for passage of successive wheels on a single truck to cross the track switch and assuming a second condition when successive actuations of the stepping switch are at a greater interval; and means responsive to the second condition of the timing means to cause the stepping switch to hunt to a rest position.

References Cited in the file of this patent

UNITED STATES PATENTS

| | | |
|---|---|---|
| 2,103,618 | Haegele | Dec. 28, 1937 |
| 2,189,879 | Brown | Feb. 13, 1940 |
| 2,525,824 | Nagel | Oct. 17, 1950 |
| 2,806,685 | Sande | Sept. 17, 1957 |